United States Patent [19]

Tomita

[11] 3,915,145
[45] Oct. 28, 1975

[54] BRIQUET IGNITING AND COOKING STOVE

[76] Inventor: Rioe Tomita, 47-126 Kaimalolo Place, Kaneohe, Hawaii 96744

[22] Filed: May 1, 1974

[21] Appl. No.: 466,055

Related U.S. Application Data

[63] Continuation-in-part of Ser. No. 257,718, May 30, 1972, Pat. No. 3,481,299.

[52] U.S. Cl. ............................. 126/25 B; 126/25 A
[51] Int. Cl.² ....................... A47J 37/07; F24B 3/00
[58] Field of Search ...... 126/9 R, 25 R, 25 A, 25 B, 126/59.5; 110/1 F

[56] References Cited
UNITED STATES PATENTS

| | | | |
|---|---|---|---|
| 521,410 | 6/1894 | Hayes................................ | 126/25 R |
| 2,513,580 | 7/1950 | Milligan ............................ | 126/25 R |
| 2,722,883 | 11/1955 | Rignell ........................... | 126/25 R X |
| 2,838,991 | 6/1958 | Kleinmann et al.............. | 126/9 R X |
| 3,172,402 | 3/1965 | Valiela ............................ | 126/25 R |
| 3,209,743 | 10/1965 | Stewart et al. .................... | 126/25 R |

FOREIGN PATENTS OR APPLICATIONS

| 394,433 | 5/1909 | France .............................. | 126/25 R |

Primary Examiner—William F. O'Dea
Assistant Examiner—Harold Joyce
Attorney, Agent, or Firm—James C. Wray

[57] ABSTRACT

A grate rests above the lower open end of a flared wall of a stove body which is joined to an upper end of a thin cylindrical wall ignition flue with substantially continuous inner surfaces so that flame and heat flow smoothly upward from ignition material within the ignition flue, flare slightly outward, pass through a grate, and impinge upon briquets on the grate. One grate has cross-members with relatively thin lower surfaces and wide upper surfaces for focusing and directing the heat and flames to the briquets. An expanded metal grate has cross-members formed by slitting and stretching a material to form diamond shaped interstices. An irregular outer periphery of the grate provides additional upward mobility for ignition heat and flames. Fasteners for outward extended handles pass inward through the stove body above the grate for holding the grate in the stove body. Ash fallout is provided at a lower end of the ignition flue. An opening in a base channel for a sliding door provides ash fallout. An upper sliding door in the ignition flue is opened upon completion of ignition.

11 Claims, 25 Drawing Figures

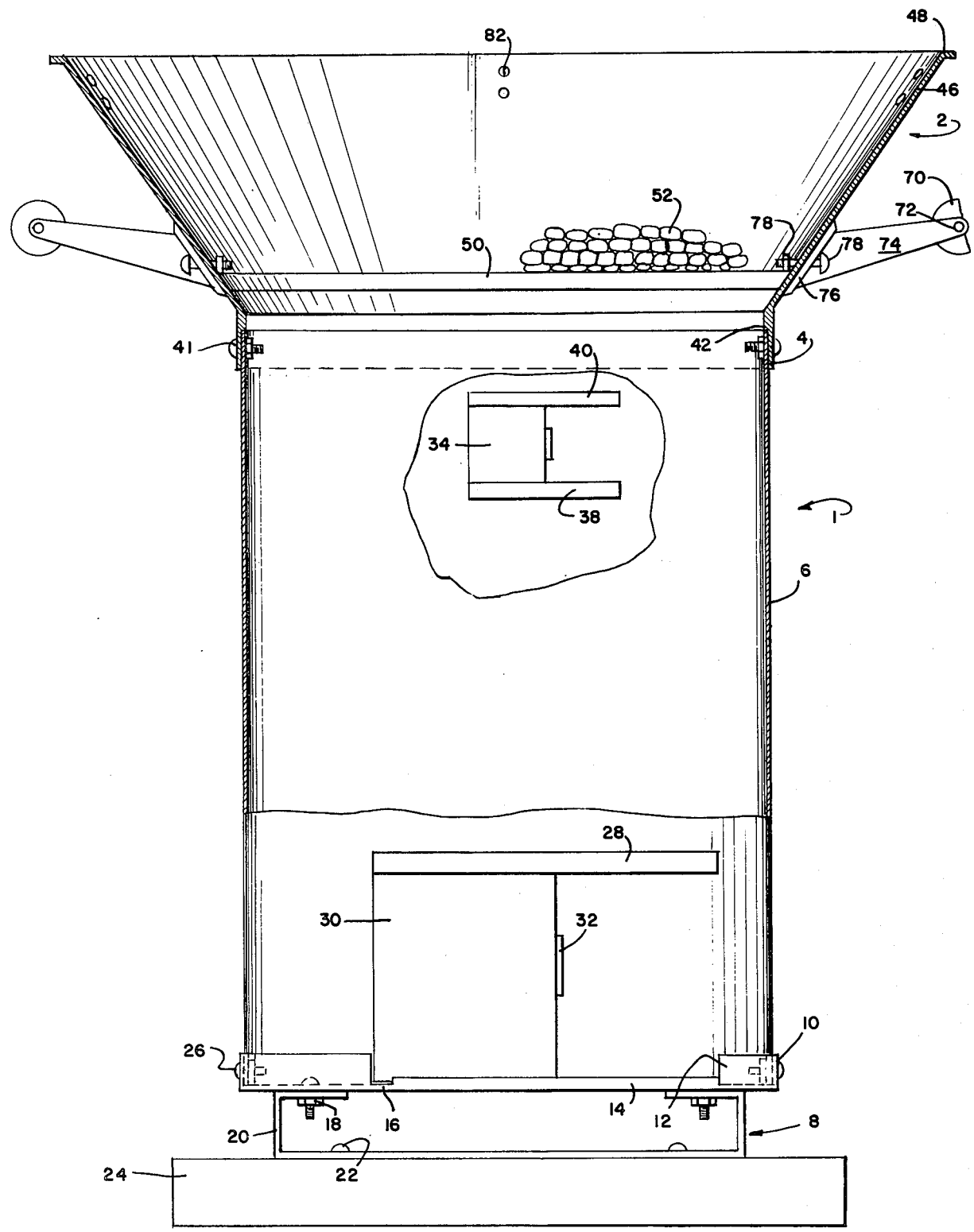

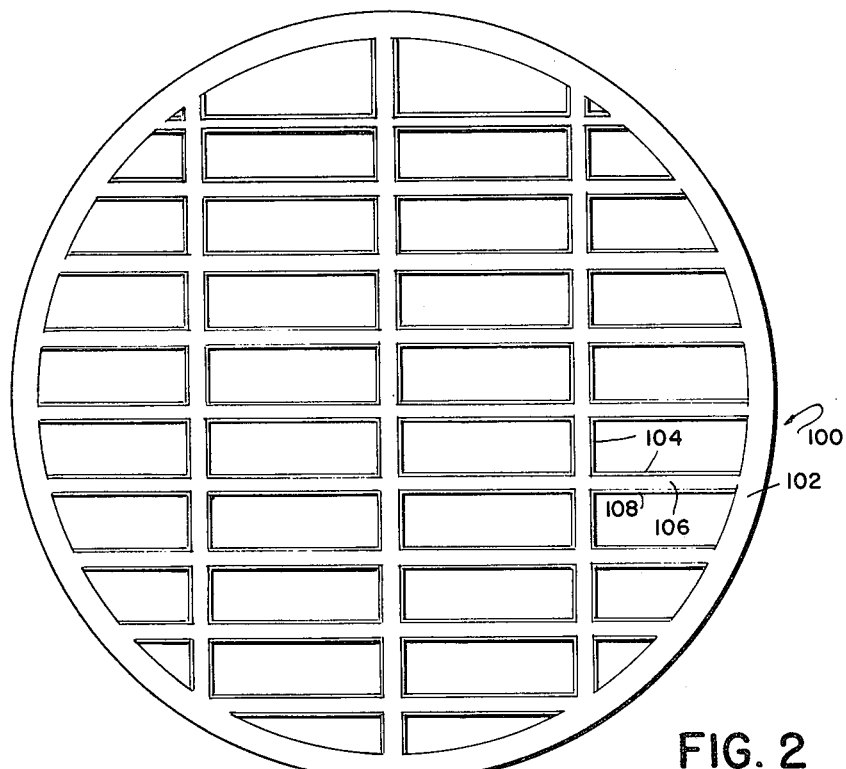
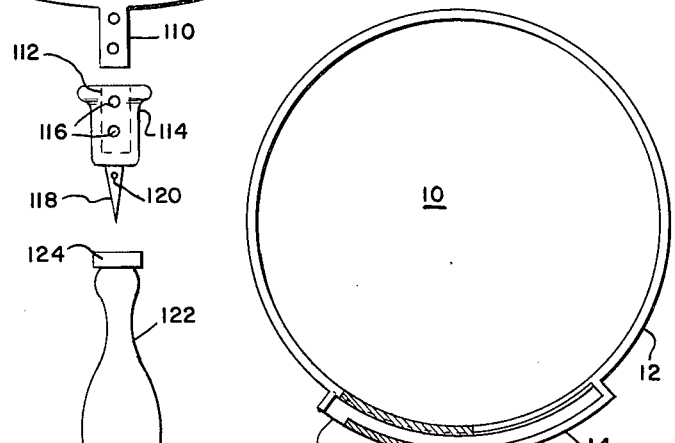

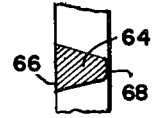
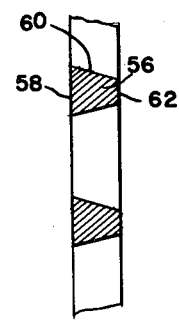
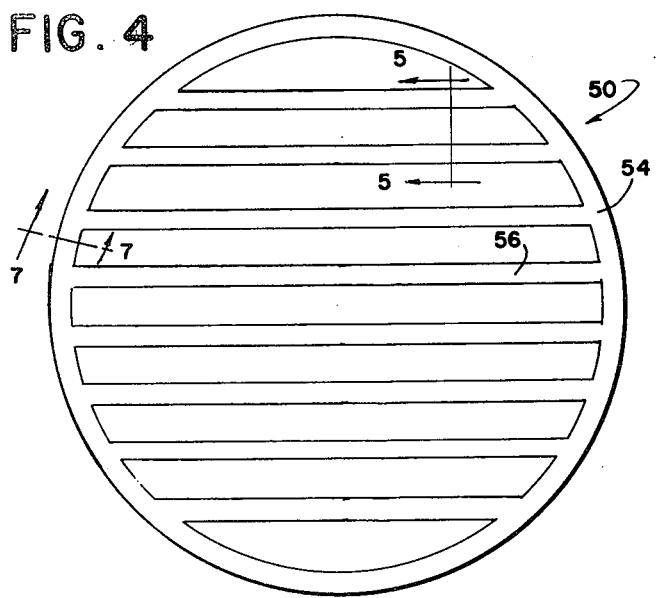
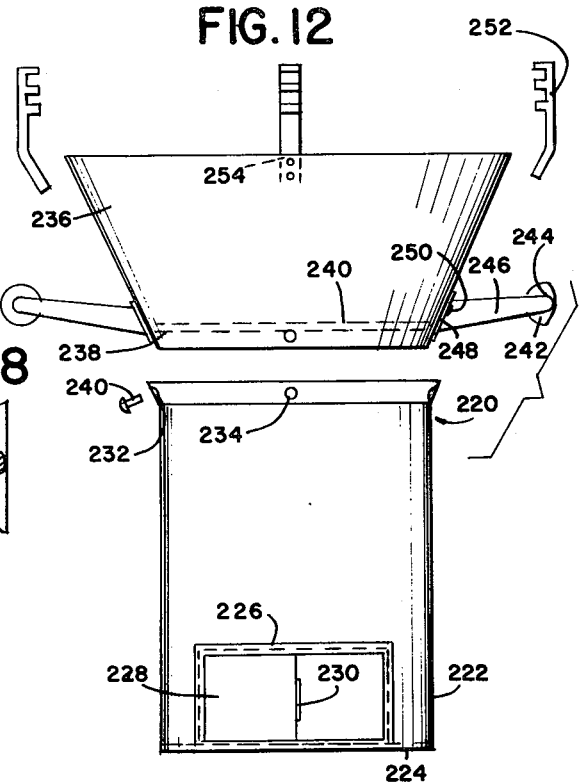
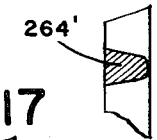
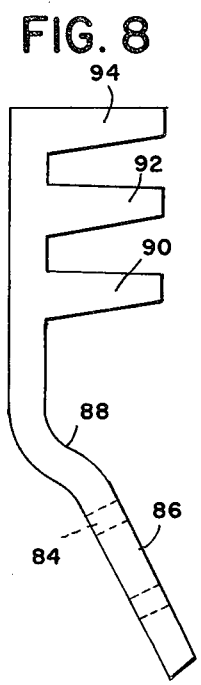
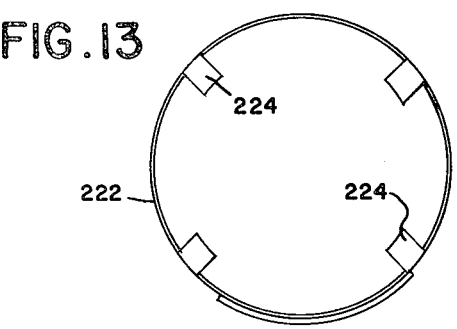
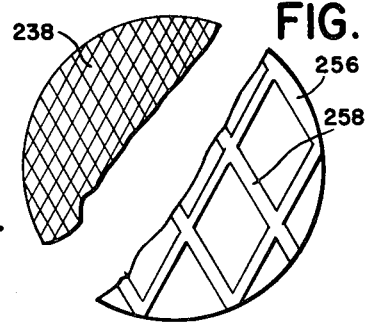

U.S. Patent Oct. 28, 1975 Sheet 4 of 5 3,915,145
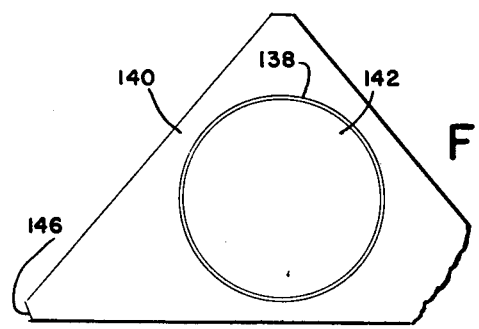
FIG. 11
FIG. 10A
FIG. 10

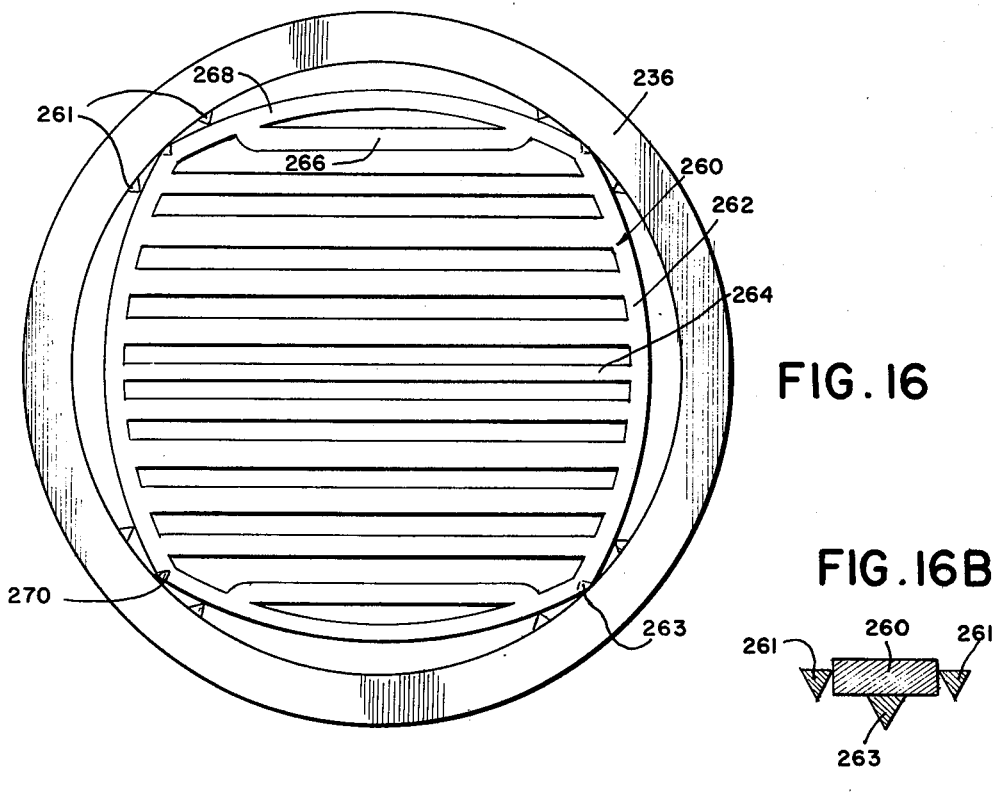
FIG. 16
FIG. 16B
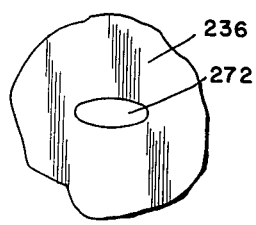
FIG. 19
FIG. 22
FIG. 20
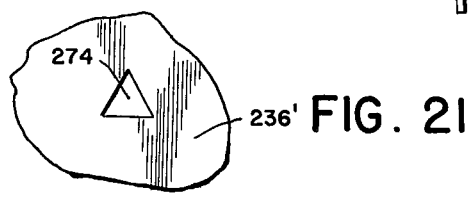
FIG. 21
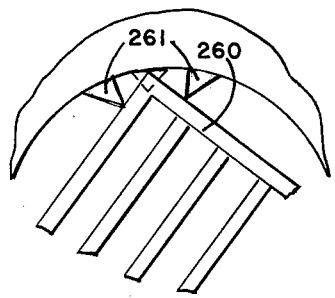
FIG. 16A

BRIQUET IGNITING AND COOKING STOVE

BACKGROUND OF THE INVENTION

This is a continuation-in-part of copending patent application Ser. No. 257,718 filed may 30, 1972, U.S. Pat. No. 3,841,299 by Rioe Tomita for PORTABLE OUTDOOR GRILL AND FIRE STARTER UNIT.

Briquet stoves are well known. Many types of briquet stoves have been used for long periods of time with great success. Examples of such stoves are the well known large round pad which supports briquets and which has a central support for holding a circular grill made with wire crosspieces above the fire part. Variations of that type of grill have usually been directed to unique support and grill height adjustments using reciprocal center posts and various overgrill devices such as wind screens and spit supports and turners and semispherical smoker hoods.

Other types of stoves which have come into wide use are Japanese-type stoves, usually made of cast iron, having a small base with outward flared rectangular walls, a grate to support briquets above the base and a flat cast iron grill which is grasped by a laterally extending handle to move the grill between vertical stops in parallel upstanding cleats at the back of the stove.

Other stoves have been devised in which grease dripping foods are cooked rapidly on a fire which is fueled by grease drippings and some quickly ignitable material.

It is the stoves of the briquet burning type to which the present invention is directed, since a problem exists in satisfactorily igniting briquets.

Historically, fuel briquets have been constructed in many methods from varied combustible materials. This invention deals with the igniting and use of any combustible briquet materials, for example charcoal. This invention includes the igniting and cooking with any materials which are difficult to ignite or which require other substances to ignite, such as for example lump charcoal.

Several substances have been used in the past for igniting briquets or chunks of difficult-to-ignite materials. Historically, cooking fires were kept burning, and fuel was added shortly before cooking was required. Fine, rapidly burning knidling materials have been used under the difficult-to-ignite materials. Currently, a method of igniting briquets favors the use of tailings from petroleum cracking processes with which briquets are soaked before igniting. Other methods use Calrods which are placed within piles of briquets before electricity is turned on.

Inherent difficulties and problems with those methods of ignition are well known. Some of the problems are high power use, unavailability of outlets and lack of provision for holding or storing electrical ignitors when at high temperature. Chemical ignitors often take a long time to prepare charcoal, sometimes do not ignite, and sometimes are consumed by flames without igniting charcoal. Inherent dangers of squirting the petroleum distillates on briquets which appear to be dead to reinitiate the ignition process are legend.

Some briquet type cooking stoves have made provision for igniting briquets with combustible kindling materials located beneath briquets.

To a certain extent such devices have been satisfactory in overcoming or avoiding problems of other ignition methods. However, known devices which employ ignition materials positioned beneath briquets have inherent disadvantages. One problem lies in the inability to focus flames and heat from combustible materials on briquets in their usual cooking orientation. A result is that a large amount of time is required to ignite briquets in the known devices and that briquets must be redistributed in many devices for cooking. The rearrangement and distribution of hot briquets is always an uncomfortable procedure which carries inherent danger. The use of large amounts of combustible materials may produce excessive flame and smoke and excessive ash. The use of large amounts of combustible materials requires large devices which are expensive and which are difficult to store and transport.

A collection of cooking stove devices is found in the United States Patent Office within the Official Classification of Patents, Class 126. Of particular interest in that class are disclosures classified within subclass 25. Examples of United States Patents officially classified in that class, cross-references of United States Patents, United States Patents unofficially classified within that class, foreign patents and publications collected by the examiner and available within that classification are the following U.S. Pat. Nos. 92,779; 2,894,447; 2,920,614; 3,209,743; 3,368,544; 3,494,349; 3,667,446; French 1909 Pat. No. 394,433 and German 1901 Pat. No. 119,128.

Many problems remain in prior art devices for the igniting of briquets and cooking with briquets or other difficult-to-ignite materials.

SUMMARY OF THE INVENTION

The present invention overcomes many of the problems which exist in prior art devices.

The present invention employs a compact apparatus to ignite briquets or other difficult-to-ignite materials and to cook with the materials once they are ignited without further handling the materials.

In a preferred form of the invention, the ignition flue is formed of a thin rigid heat resistant material in a continuous vertical wall about a vertical axis. The tubular wall may be rectangular or polygonal. Preferably the vertical wall is cylindrical. The ignition flue has an open end and preferably has an open lower end.

Support means are joined with the bottom of the ignition flue for supporting the ignition flue on the ground which includes directly on the earth or other similar ground-type surface. In a preferred embodiment, the support means are inward-projecting tabs connected to a lower end of the tubular flue. Ash from the ignition material and the briquets falls directly onto the ground, where the ask may be raked or kicked over the ground surface to benefit the soil.

An upper end of the ignition flue, and a lower end of the stove body are configured for cooperating to provide a smooth fluent internal flow surface for flames and heat from the ignition flue to the stove body.

Preferably, the stove body is constructed with upwardly and outwardly flared walls which have horizontal cross-sections similar to horizontal cross-sections of the ignition flue. In a preferred embodiment, the wall of the stove body is in the form of a truncated cone. The outward conical flaring provides slight flaring of the heat and flame from the ignition material to ignite the briquets and provides outward flaring of heat from the briquets for cooking food at maximum efficiency.

In one embodiment, the connection between the stove body and the ignition flue is a cylindrical extension on a lower end of the stove body which fits over the upper cylindrical wall portion of the ignition flue. A slight inward projecting collar or lip at the top of the extension precisely overlies the upper end of the ignition flue so that a continuous innersurface is provided.

In a preferred embodiment of the invention, the connection between the ignition flue and the stove body is an outward flaring of the upper wall of the ignition flue to a slope commensurate with the slope of the stove body wall. A lower portion of the sloping stove body wall fits within the flared upper end of the ignition flue so that a smooth innersurface is formed.

In both cases, fasteners are provided between the ignition flue and the stove body in preferred embodiments. In the flared embodiment, the fasteners project upward through the flare into the stove body where they form an auxiliary grate support.

In a preferred embodiment of the invention, the briquet grate is supported by the stove body a short distance above the interconnection, so that the grate has greater horizontal dimensions than the ignition flue. Flames and heat from the ignition flue flare outward before encountering the grate.

In a preferred embodiment, the grate is formed of slit and stretched expanded metal with diamond shaped interstices between angularly intersecting crossmembers. In a preferred embodiment, the periphery of the grate is irregular as compared with the corresponding wall portion of the stove body so that flames and heat may flow upward between the stove body and grate. In a preferred embodiment, surface deformations are formed in the stove body to receive lateral projection portions of the grate.

In a preferred form of the invention, grate crossmembers have relatively narrow lower walls and relatively wide upper walls for supporting briquets. The narrow lower walls and the sloping side walls of the grate crossmembers facilitate and focus flow of heat and flames upward through the grate to the briquets.

Handles are provided on the stove body. Metal brackets extend outward from the stove body, and wooden handles extend between adjacent brackets. In a preferred embodiment, pairs of handle brackets are mounted on opposite sides of the stove body with fasteners passing through bases of the brackets and through the stove body and projecting above the grill. The projecting fasteners assist in holding the grill in the stove body, such as when the stove body is tipped to spill briquets or ashes.

An opening is provided in a lower portion of the ignition flue wall. A means to mount a gate is provided adjacent the opening, and a gate is held by the means to selectively open and close the opening. Ignition materials which may be crumpled newspapers are inserted through the opening and are ignited through the opening. The opening is left open during ignition, and it may be partially shut while the ignition materials are burning or while the briquets are burning after ignition. Preferably, the door is a door which slides laterally between upper and lower channels. In a preferred embodiment of the invention, the opening extends to the bottom of the vertical wall of the ignition flue, and the bottom channel has an open portion so that ashes may fall outward through the opening and open portion of the channel.

In one embodiment of the invention, an upper opening, near an upper end of the ignition flue, is provided. A connection means is provided on the ignition flue wall near the upper opening, and a door is connected to the connection means for selectively opening or closing the upper opening. Preferably, the door slides laterally between upper and lower channels. The door is closed during burning of the ignition material and is opened following completion of the ignition to control the low fire draft and hence briquet combustion intensity.

Means for mounting a grill is provided at an upper end of the stove body. In one embodiment the grill mounting means comprise vertical upright supports in upward extension of the stove body for receiving a laterally inserted grill at a selected level.

In one embodiment of the invention, the stove body is formed of a first base part which supports a grill on upward and outward flared walls above the ignition flue with a smooth substantially continuous innersurface and a second upper part connected to the base part which supports the grill. The base part and the upper part complete the bottom portion of a generally semispherical smoker grill. A semispherical smoker hood is provided in the usual manner. The support means include three legs which extend downward from the second, grill-supporting portion of the stove body and a triangular pan which is connected to the legs. The triangular pan has a continuous depression for receiving a lower end of the ignition flue.

One object of the invention is the provision of briquet igniting and cooking stove apparatus which has a thin continuous wall ignition flue supporting a cooking stove with a wall which uniformly slopes outward and upward from a lower end of the stove body which is contiguous with an upper end of the ignition flue.

Another object of the invention is the provision of an igniting and cooking stove with a substantially continuous innersurface between an ignition flue and an upward and outward sloping wall of a cooking stove and with a briquet-holding grate mounted in the cooking stove body slightly above the intersection of the stove body and the ignition flue.

Another object of the invention is the provision of a slit and stretched expanded metal grate for a briquet igniting and cooking stove.

Another object of the invention is the provision of an irregular periphery grate for such a stove.

Another object of the invention is the provision of a grate having cross-members with relatively narrow bottom walls and relatively wide upper walls for such a stove.

Another object of the invention is the provision of cooperating surface deformations in a stove body and lateral projections on an irregular periphery grate for cooperating in holding the grate with spaces between the stove body wall and grate for encouraging flame and heat flow along the stove body wall.

Another object of the invention is the provision of a handles mounting means with inward projecting fasteners for holding a grate within a stove body.

Another object of the invention is the provision of an outward flared ignition flue for holding a sloped wall stove body with a substantially continuous innersurface between the body and the flue.

Another object of the invention is the provision of ignition material inserting lower gates and combustion controlling upper gates for ignition flues attached to stove bodies.

Another provision of the invention is the support means with the ash clean-out facility.

One other object of the invention is the provision of a briquet igniting and cooking stove apparatus comprising a support means configured for mounting on ground, a tubular ignition flue connected to the support means and extending upward therefrom, the tubular ignition flue comprising a thin rigid heat resistant material formed in a continuous wall about a vertical axis and having open upper and lower ends, the lower end being connected to the support means, and the upper end being configured for permanent attachment to a stove body, and a stove body constructed of a rigid heat-resistant material and formed of a continuous wall sloping upward and outward with respect to a vertical axis and having open upper and lower ends, a lower end of the stove body being configured for interfitting with an upper end of the ignition flue whereby innersurfaces of the ignition flue at the upper end and of the stove body at the lower end are substantially continuous, and wherein the tubular ignition flue has an opening in its continuous wall adjacent a lower end, and further comprising gate holding means connected to the tubular ignition flue wall adjacent the opening, and a gate movably mounted in the gate holding means for selectively covering and uncovering the opening to provide egress for ignition material and air.

These and other modifications and variations of the invention are apparent in the disclosure which includes the foregoing and ongoing specification and claims and the drawings.

BRIEF DESCRIPTION OF THE DRAWINGS

FIG. 1 is a front elevation, partially in cross-section, showing a first embodiment of the briquet igniting and cooking stove apparatus of the present invention.

FIG. 2 is a plan view detail, partially in section, of the ignition flue support pan of the FIG. 1 embodiment.

FIG. 3 is a front view elevational detail of FIG. 2.

FIG. 4 is a plan view detail of the grate shown in the FIG. 1 embodiment.

FIG. 5 is a sectional detail of grate cross-members shown in FIG. 4.

FIG. 6 is a sectional view alternative detail of grate cross-members.

FIG. 7 is a detail of an edge of the grate of FIG. 4, shown partially in cross-section.

FIG. 8 is a detail of a grill support for use in the FIG. 1 embodiment.

FIG. 9 is a detail of a grill used in the FIG. 1 embodiment.

FIG. 10 is a front elevation, partially in section, of a second embodiment of a briquet igniting and cooking stove of the present invention. FIG. 10A is a detail of a preferred embodiment of the igniter.

FIG. 11 is a detail of the support pan shown in FIG. 10.

FIG. 12 is a detail of a third, preferred embodiment of the present invention.

FIG. 13 is a detail of the support means at the bottom of the ignition flue of the FIG. 12 embodiment.

FIG. 14 is a detail of the expanded metal grate in the FIG. 12 embodiment.

FIG. 15 is an enlarged detail of the grate of the FIG. 12 embodiment.

FIG. 16 is an alternate grate for use in the FIG. 12 embodiment. FIGS. 16A and 16B are details of the preferred grate supports.

FIG. 17 is a cross-sectional detail of cross-members of the grate of FIG. 16.

FIG. 18 is an alterate detail of cross-members of the grate of FIG. 16.

FIG. 19 is a detail of surface deformations in the stove body wall of FIG. 16.

FIG. 20 is a cross-sectional detail of the stove body wall deformation shown in FIG. 19.

FIG. 21 is a detail of an alternate stove body wall deformation for supporting a grate.

FIG. 22 is a cross-sectional detail of the stove body wall deformation shown in FIG. 21.

DETAILED DESCRIPTION OF THE DRAWINGS

Referring to FIG. 1, a briquet igniting and cooking stove is generally indicated by the numeral 1. The stove comprises a stove body generally indicated by the numeral 2, which has a downward cylindrical extension 4 for connection to an upper portion of an ignition flue 6. The ignition flue is formed of a continuous steel sheet which may be seamed and welded vertically. Ignition flue 6 of the FIG. 1 embodiment is formed of a wall having a thickness of 1.5 millimeters, a height of 10 inches and a diameter of 7⅛ inches. Ignition flue 6 is supported by a support means 8 which includes a cast iron pan 10 having an upturned edge 12. A part 14 of edge 12 is lowered and is displaced outward to form a door slide channel. A portion 16 of the channel is removed to provide an ash fall-off area. Fasteners 18 hold the pan to two steel brackets 20. Fasteners 22 hold the steel brackets 20 to the remainder of the support which is a wooden block 24. Fasteners 26 hold the pan 10 on the lower edge of the ignition flue 6.

Channel 28 is mounted on an exterior of the ignition flue parallel to channel 14. A sliding door 30 is mounted between the channel to close an opening, not shown, behind the door. Door 30 is slid to the right to open the opening for insertion of combustible materials and for provision of a bottom draft. Handle 32 is on the edge of door 30 which is away from the opening to prevent burning of the fingers when opening the door.

An upper vent slide gate 34 having a handle 36 closes an upper vent opening by sliding between two parallel spot-welded channels 38 and 40. Gate 34 may be approximately 1 × 1 inch, and gate 30 may be approximately 3 × 3 inches. Forward gate 30 is closed three to four minutes after ignition to prevent fine newspaper ash from flying in air draft created by the rising heat. Upper gate 34 is opened to allow the briquets to burn with continuity. The upper gate 34 controls air entry and regulates heat intensity while food is being grilled. The ask fallow-off area 16 ensures that the lower gate 30 may be completely closed by preventing buildup of ashes in channel 14.

An inward-projecting collar or lip 42 on the stove body 2 fits precisely on top of the upper edge of ignition flue 6 so that the inside cylindrical wall has a minimum amount of obstruction and allows the flame to rise straight up. Except for the two bolts and nuts 41, there are no obstructions within the metal cylinder which is the ignition flue 6. As an example, the lip may be approximately 5 millimeters wide in a vertical dimension, and the collar 4 may be approximately 10 millimeters wide.

The stove body 2 is designed to give maximum efficiency so that briquets are ready for cooking in 6 minutes. The body 2 is formed with upward and outward sloping frusto-conical wall 46 to control and evenly disperse the flame from the ignition flue to briquets and the heat from the briquets to a grill. A rim 48 is formed outward on the upper surface of conical wall 46.

Grate 50 is positioned approximately one-half inch above the base of the frusto-conical wall 46 so that the flame from the newspaper in the ignition flue 6 flares out to impinge on the briquets in a wider area. If grate 50 were placed on the base of the frusto cone, a smaller briquet area would be infringed on by the flame, requiring much more time to ignite the briquet and providing less heat from the briquets 52 to food on a grill.

As shown in the details of FIGS. 4 through 7, grate 50 is designed for burning briquets efficiently. The grate rim 54 is wide on the top and narrow below, as shown in detail FIG. 7, so that flame rises with minimum resistance through the grate to impinge on briquets resting on the grate. The parallel grate cross-members 56 are spaced approximately 13 to 15 millimeters apart and are 6 millimeters wide on the upper surfaces 58 and are 2.5 millimeters wide on lower surfaces 62. The cross-section of the grate cross-members with their sloping walls 60 efficiently flows heat and flame through the grate to the briquets.

As shown in FIG. 6, cross-members 64 may be formed with flat upper faces 66 and rounded narrow lower faces 68.

In the FIG. 1 embodiment, large wooden dowel handles 70 are attached to the stove body by nails 72 driven through holes in outer extremities of parallel brackets 74. Each bracket 74 has an outward extending base flange 76 which lies flat against the stove body wall 46. Fasteners 78 extend through the flanges 76 and wall 46 and project inward over grate 50. The fasteners hold the grate 50 in place when the stove is tipped to dump hot briquets. The handles 70 are spaced at least two inches from the outside of the stove wall.

Three grill supports such as shown in FIG. 8 are attached to holes 82 near the upper edge of stove body wall 46 by fasteners which extend through holes 82 and holes 84 in the supports 86. Bent portions 88 of the supports extend outward around the upper flange 48 of the stove. Parallel cleats 90, 92 and 94 provide two positions for raising the grill above the flange.

A circular cast iron and chromed grill 100, as shown in FIG. 9, fits into the three supports. The grill has a circular rim 102 and cross-members 104 which have flat surfaces 106 and sloping walls 108. A laterally extending lug 110 fits into a recess 112 in a holder 114, and bolts are inserted through holes 116 to hold the grill after spike 118 has been driven into the wooden handle and secured by a nail driven into hole 120 through the throat of the wooden handle 122. A metal reinforcing band 124 completes the assembly.

FIG. 10 shows the apparatus employed in a barbecue grill and smoker oven 130. The device has a lower semispherical body 132 and an upper hood 134. FIG. 10A shows a preferred assembly with ignition flue 136 inside of collar 176.

An ignition flue 136 has a lower end supported within the circular depression 138 in the triangular steel support pan 140. Pan 140 has a cast iron center 142 approximately one-eighth inch thick. Tabs 146 are formed at apexes for joining with fasteners 148 to legs 150. Bottoms 152 of side legs are configured for receiving wheels 154 on bolted axles 156. A rubber boot 158 may be provided on a rear leg. Lifting the rear leg slightly permits the device to be rolled on wheels 154.

A sliding gate 160 with a handle 162 moves between channel 164 and the groove 138. Parallel spot-welded channel 166 and 168 confine a door 170 for lateral movement as controlled by handles 172 to control the opening of an air vent in an upper portion of ignition flue 136. Door 170 is approximately 1 × 1 inch; the lower door 160 is approximately 3 × 3 inches. The ignition flue 136 has a diameter of 7 inches and a height of approximately 9 inches.

The stove body has two parts, an upper part 132 and a lower part 174 which may be made of cast iron. An outer collar 176 and an inner lip 178 hold the body 174 on the ignition flue 136, and fasteners 180 complete the assembly. Body 174 slopes outward to an upper flange 182 which is joined by fasteners 184 to a lower portion of the upper portion 132. Grate supports 186 are provided around and inside of body 174, and a grate 188 rests upon the grate supports. Door 189 slides on tracks 187 to permit insertion of charcoal.

Grill supports 190 are anchored to the sheet metal body 132 with bolts, and a reevable grill 192, with welded runs and rim, rests upon the grill supports.

An outward turned rim 194 supports the hood 134 on an upper edge of body 132. A handle 196 held by a bolt 198, brackets 200 and fasteners 202 enable the lifting of the hood 134. An upper vent between channels 204 and 206 is closed by a door 208 with handle 210.

A preferred embodiment of the invention is generally indicated by the numeral 220 in FIG. 12. An ignition flue 222 has open upper and lower ends. A support means comprises tabs 224 which are bent inward from wall 222. A rectangular frame 226 with upper and lower and lateral channels is welded on the flue 222 to hold a sliding door 228. Handle 230 is mounted on the door away from the direction of the access opening.

An upper end of the flue 222 has a rim 232 which is turned outward at an angle similar to the slope of the wall 236 of the stove body. Holes 234 admit fasteners 240 which connect the two parts and which project inward in the stove body to further support grate 238. Handle 242 is connected by nails 244 to parallel brackets 246 on opposite sides of stove body 236. Flanges 248 parallel to the body receive fasteners 250 which project into the body to hold the grate firmly in place. Cast grill supports 252 are connected to upper edges of wall 236 with fasteners 254.

As shown in FIGS. 14 and 15, grate 258 is made of slit and stretched expanded metal with diamond-shaped interstices between angularly oriented integrally formed cross-pieces 256 and 288. The openings may be approximately 1½ × ⅝ inches. The ignition flue 222 may have a diameter of approximately 7¼ inches and a height of 11 inches. A 9 inch clay plate may be provided for supporting the stove.

An alternate grate is shown in FIG. 16. Stove body 236 supports the grate 260 which has elliptically shaped major rim sections 262 supporting cross-members 264. Cross-members 266 have curved ends near the minor elliptical portions 268 of the rims 260. Innersections 270 of the elliptical portions of the rim form projections which are positioned between projections 261 and supported on projections 263 on the stove body wall 236, as shown in the detail FIGS. 16A and 16B.

As shown in FIG. 17, the cross-members 264 and the rim portions may have wide upper walls and no lower walls. For example the upper walls may be approximately 6 millimeters and the lower walls may be approximately 3 millimeters with the cross-bars spaced on 15 millimeter centers as shown in FIG. 17. Alternativenly, the bottoms of the cross-members may be rounded as shown in FIG. 18.

FIG. 19 is an alternate detail of wall 236 in which projections 270 are received in recesses 272 formed in the wall. A side elevation of the recesses is shown in FIG. 20.

FIGS. 21 and 22 are details of an alternate form in which wall 236 is recessed with triangular recesses 274 to receive the projections 270 of the grill 260.

Although the present invention has been described with reference to specific embodiments, it will be obvious to those skilled in the art that modifications and variations of the invention may be made without departing from the scope of the invention. The scope of the invention is precisely defined in the following claims.

I claim:

1. Briquet ignitor and cooking stove apparatus comprising a support means configured for mounting on ground, a tubular ignition flue connected to the support means and extending upward therefrom, the tubular ignition flue comprising a rigid heat resistant material formed in a continuous wall about a vertical axis and having open upper and lower ends, the lower end being connected to the support means, and the upper end being configured for attachment to a stove body, and a stove body constructed of a rigid heat-resistant material and formed of a continuous wall sloping upward and outward with respect to a vertical axis and having open upper and lower ends, a lower end of the stove body being configured for interfitting with an upper end of the ignition flue whereby inner surfaces of the ignition flue at the upper end and of the stove body at the lower end are substantially continuous, and wherein the tubular ignition flue has an opening in its continuous wall adjacent a lower end, and further comprising gate holding means connected to the tubular ignition flue wall adjacent the opening, and a gate movably mounted in the gate holding means for selectively covering and uncovering the opening to provide egress for ignition material and air, a relatively small vent door opening in the flue wall near an upper end, and means for selectively closing and opening the vent door opening to create a substantially continuous wall while ignition material is burning in the ignition flue and to provide an air opening for admitting air beneath briquets after the ignition material has finished burning.

2. The briquet igniting and cooking stove apparatus of claim 1 wherein the stove body comprises means for holding a grate internally in the stove body slightly upward from the lower end, and a grate mounted on the holding means for supporting briquets.

3. The briquet igniting and cooking stove apparatus of claim 2 wherein the holding means comprises isolated surface outward deformations of the stove body and wherein the grate has an irregular surface with projections for fitting into the surface deformations.

4. The briquet igniting and cooking stove apparatus of claim 2 wherein the grate has cross members and wherein the cross members have relatively narrow lower walls, relatively wide upper walls and upward and outward sloping lateral walls joining the lower and upper walls, whereby the relatively wide upper walls support briquets, and the relatively narrow lower walls encourage upward mobility of flames and heat from the ignition flue.

5. The briquet igniting and cooking stove apparatus of claim 2 wherein the grate comprises a slit and stretched expanded metal grate having diamond shaped interstices between angularly intersecting cross members, whereby small briquets are held on the expanded metal grate and flames and heat from the ignition flue are permitted upward travel through the grate to the briquets with little resistance.

6. The briquet igniting and cooking stove apparatus of claim 2 further comprising handle supports having inward ends configured for mounting on the stove body and having outward ends configured for receiving handles, handles mounted on the outer ends, and fasteners mounted on the inward ends and extending through the inward ends and through the stove body at positions just above the grate, whereby grates are held downward by the fasteners which connect the handle supports to the stove body.

7. The briquet igniting and cooking stove apparatus of claim 1 wherein the support means comprises tabs joined to a lower end of the ignition flue wall and extending therefrom substantially normally for supporting the ignition flue and the cooking stove apparatus on ground.

8. The briquet igniting and cooking stove apparatus of claim 1 wherein an upper end of the flue body is flared outward at a slope which is commensurate with a slope of a lower portion of a wall of the stove body, whereby the lower portion of the stove body wall fits within the outward flare of an upper portion of the ignition flue wall, and further comprising fastening means interconnecting the outward flared portion and the lower portion of the stove body wall.

9. The briquet igniting and cooking stove apparatus of claim 1 wherein a lower end of the stove body has an end for fitting externally on an upper end portion of the ignition flue and wherein the stove body further comprises a thin inward projecting lip for resting on an upper axial end of the ignition flue and for forming a substantially continuous surface with an inside of the ignition flue, and wherein the stove body wall flares outward, and wherein the grate is positioned slightly above the lip and extends outward beyond the lip to the outward sloping stove body wall.

10. The briquet igniting and cooking stove apparatus of claim 1 wherein the means for mounting a door adjacent the lower opening comprise parallel upper and lower channels along the door opening and extending laterally to one side of the opening, and wherein a portion of the lower channel adjacent the opening is removed to provide ash fallout from the opening.

11. The briquet igniting and cooking stove apparatus of claim 1 wherein the support means comprises a triangular support pan having means at apexes for attachment to legs and having a continuous depression in the pan commensurate with a lower edge of the continuous ignition flue wall for receiving the lower end of the wall and supporting the ignition flue.

* * * * *